(12) United States Patent
Pacha et al.

(10) Patent No.: US 11,575,336 B2
(45) Date of Patent: Feb. 7, 2023

(54) TECHNIQUE FOR ON-THE-FLY START-UP OF A PERMANENT MAGNET AC MOTOR WITHOUT A SPEED OR POSITION SENSOR

(71) Applicant: NXP USA, Inc., Austin, TX (US)

(72) Inventors: Matej Pacha, Jihlava (CZ); Simon Zossak, Trstena (CZ); Lukas Gorel, Povazska Bystrica (SK)

(73) Assignee: NXP USA, Inc., Austin, TX (US)

( * ) Notice: Subject to any disclaimer, the term of this patent is extended or adjusted under 35 U.S.C. 154(b) by 309 days.

(21) Appl. No.: 16/428,261

(22) Filed: May 31, 2019

(65) Prior Publication Data

US 2020/0382035 A1 Dec. 3, 2020

(51) Int. Cl.
| | |
|---|---|
| H02P 21/32 | (2016.01) |
| H02P 21/18 | (2016.01) |
| H02P 21/22 | (2016.01) |
| H02P 21/34 | (2016.01) |
| H02P 27/08 | (2006.01) |

(52) U.S. Cl.
CPC .............. *H02P 21/32* (2016.02); *H02P 21/18* (2016.02); *H02P 21/22* (2016.02); *H02P 21/34* (2016.02); *H02P 27/085* (2013.01)

(58) Field of Classification Search
CPC .......... H02P 21/18; H02P 21/22; H02P 21/34; H02P 27/085
See application file for complete search history.

(56) References Cited

U.S. PATENT DOCUMENTS

| | | | |
|---|---|---|---|
| 7,211,984 B2 | 5/2007 | Patel et al. | |
| 7,800,323 B2 | 9/2010 | Nguyen Phuoc | |
| 8,760,099 B2 | 6/2014 | Lin et al. | |
| 9,614,473 B1* | 4/2017 | Qian | ................... H02P 21/0021 |
| 9,705,438 B2 | 7/2017 | Zhao et al. | |
| 2005/0242767 A1* | 11/2005 | Ho | .......................... H02P 21/22 |
| | | | 318/808 |

(Continued)

FOREIGN PATENT DOCUMENTS

EP 2573934 A1 3/2013

OTHER PUBLICATIONS

Saeed Golestan et al., Five Approaches to Deal With Problem of Offset in Phase-Locked Loop Algorithms: Design Considerations and Performance Evaluations, IEEE Transactions on Power Electronics, vol. 31, No. 1, Jan. 2016.

(Continued)

*Primary Examiner* — Muhammad S Islam
*Assistant Examiner* — Bradley R Brown

(57) ABSTRACT

A method and apparatus are provided for controlling a sensorless multi-phase permanent magnet (PM) motor by sensing induced motor terminal voltages from the PM motor while the rotor is spinning, generating an input voltage vector signal from the plurality of induced motor terminal voltages, projecting the input voltage vector signal to a transformed voltage vector signal which does not include DC-offset components by using a Clarke transformation without a zero component that is applied to the input voltage vector signal, and estimating an initial rotor position of the rotor from the transformed voltage vector signal, wherein said sensing, projecting, and estimating are performed while a power converter for the sensorless multi-phase PM motor is disabled.

23 Claims, 6 Drawing Sheets

(56) References Cited

U.S. PATENT DOCUMENTS

| | | | |
|---|---|---|---|
| 2007/0132415 A1* | 6/2007 | Patel | H02P 25/03 |
| | | | 318/432 |
| 2011/0248659 A1* | 10/2011 | Balazovic | H02P 6/185 |
| | | | 318/400.33 |
| 2012/0217923 A1* | 8/2012 | Wu | H02P 21/06 |
| | | | 318/610 |
| 2013/0221885 A1* | 8/2013 | Hunter | H02P 6/34 |
| | | | 318/400.15 |
| 2014/0232311 A1* | 8/2014 | Hill | H02P 6/185 |
| | | | 318/400.33 |
| 2018/0131305 A1* | 5/2018 | Wang | H02P 6/04 |
| 2018/0175765 A1 | 6/2018 | Ishikawa | |
| 2018/0191284 A1* | 7/2018 | Wu | H02P 27/08 |
| 2019/0006974 A1 | 1/2019 | Della Flora et al. | |
| 2020/0313591 A1* | 10/2020 | Mo | H02P 21/22 |

OTHER PUBLICATIONS

Tero Halkosaari et al., Speed Sensorless Vector Control of a Redundant Permanent Magnet Wind Power Generator, IEEE 2007.

Shweta Singh et al., Various Techniques of Sensorless Speed Control of PMSM: A Review, IEEE 2017.

Wikipedia, "Alpha-beta transformation", Oct. 13, 2018, retrieved from the internet at https://en.wikipedia.org/w/index.php?title=Alpha-beta_transformation&oldid=863869631 on Apr. 6, 2022.

* cited by examiner

TECHNIQUE FOR ON-THE-FLY START-UP OF A PERMANENT MAGNET AC MOTOR WITHOUT A SPEED OR POSITION SENSOR

BACKGROUND OF THE INVENTION

Field of the Invention

The invention relates generally to the field of electric motors. In one aspect, the present invention relates to the control and operation of sensorless permanent magnet motors.

Description of the Related Art

With brushed DC electric motors, an internally commutated electric motor is powered by a direct current power source to drive or mechanically rotate a rotor with varying speeds by changing the operating voltage or the strength of the magnetic field. The commutator provides a self-controlling mechanism by acting as a mechanical switch which connects rotor winding to the power source and which activates only the coils which can interact with the static magnetic field of a stator. Subsequently, brushless DC motors were developed in which the topology was reversed (e.g., by using static coils and rotating permanent magnets) and the mechanical commutator was replaced by electronics. In addition, synchronous AC motors with permanent magnets, such as permanent magnet synchronous motors (PMSM), have been developed for smaller applications, such as power electronics which use smaller motors. While permanent magnet machines can use vector control techniques, such as FOC (Field Oriented Control) or DTC (Direct torque control), to provide a good dynamic performance and full start-up torque, these techniques require information about the rotor position to be able to activate proper coils on the stator. In the absence of mechanical or electrical contact between the stator and rotor, there are challenges with determining the relative positions and rotor speeds of the component parts. One position-indicating arrangement is to use sensors (e.g., Hall sensors, magneto-resistive sensors, encoders, resolvers (sin-cos), etc.) to detect a motor component position status as part of the motor control function, but such sensors add cost and increase complexity (due the additional sensors, wiring, connectors, soldering, etc.), reduce reliability (due in part to the sensor connectors that are prone to contamination from dirt and humidity), and are not suitable for applications (e.g., where the rotor is in closed housing and the number of electrical entries must be kept to a minimum, such as in a compressor, or in applications where the motor is immersed in a liquid such as some pumps).

To address such shortcomings of sensor-based motor controls, "sensorless" or "self-sensing" algorithms have been developed which use various techniques, such as model-based observers, back electromotive force (EMF) zero-crossing detectors or high frequency signal injection methods, to detect a motor component position status. However, there are limitations with such solutions that can arise, depending on the application. For example, high frequency signal injection techniques can be unsuitable for automotive applications due to electromagnetic coupling issues. In addition, such sensorless techniques typically require that the motor be actively driven from the power converter, which in turn present challenges when a permanent magnet motor is started or restarted "on the fly" when the motor is spinning. For example, there are automotive motor applications where the rotor is forced to spin even if the motor is not powered or controlled, such as when wind blows through the fan wheel. Once activated in the sensorless mode, the control unit is usually not able to detect the rotor speed or position, thus risking damage to the motor from dangerous current peaks due to misalignment of the electromotive force of the motor and the voltage generated by the power converter. While there are techniques for detecting the rotor position with AC motors, they typically require that the power converter must be activated. Additional drawbacks with existing sensorless motor control techniques include operational complexity, expensive microcontroller requirements, and increased bill-of-materials costs. As a result, the existing solutions for operating permanent magnet motors are extremely difficult at a practical level by virtue of cost constraints, performance requirements and/or computational power requirements.

BRIEF DESCRIPTION OF THE DRAWINGS

The present invention may be understood, and its numerous objects, features and advantages obtained, when the following detailed description is considered in conjunction with the following drawings.

DETAILED DESCRIPTION

A sensorless control method and apparatus for a multi-phase permanent magnet (PM) alternating current (AC) motor are described for reliably and efficiently determining the rotor position and speed based on a multi-phase H-bridge power converter connected to a multi-phase motor by using a electromotive force (EMF) sensing to detect voltages on the motor terminals when not being driven by the power converter, and to apply a predetermined projection which removes voltage offsets and distortions introduced by the power converter hardware so that the position of the transformed voltage vector may be used to calculate the rotor position and/or speed. In selected embodiments, a method, system, and apparatus are provided for controlling a PM motor to be started on-the-fly or restarted the same way by using a signal processing unit in combination with a rotor position detection unit. In operation, the signal processing unit transforms a three-phase vector representation of the input signal voltages into an orthogonal system using a Clarke transform without the zero component (referred to herein as the "beta projection") to remove any DC offset, thereby determining the vector position of the input signals with the offset removed. In addition, the rotor position detection unit uses the transformed voltage vector to calculate a rotor position in time which may be used by the field oriented control technique to start driving the motor properly.

Figure 1:
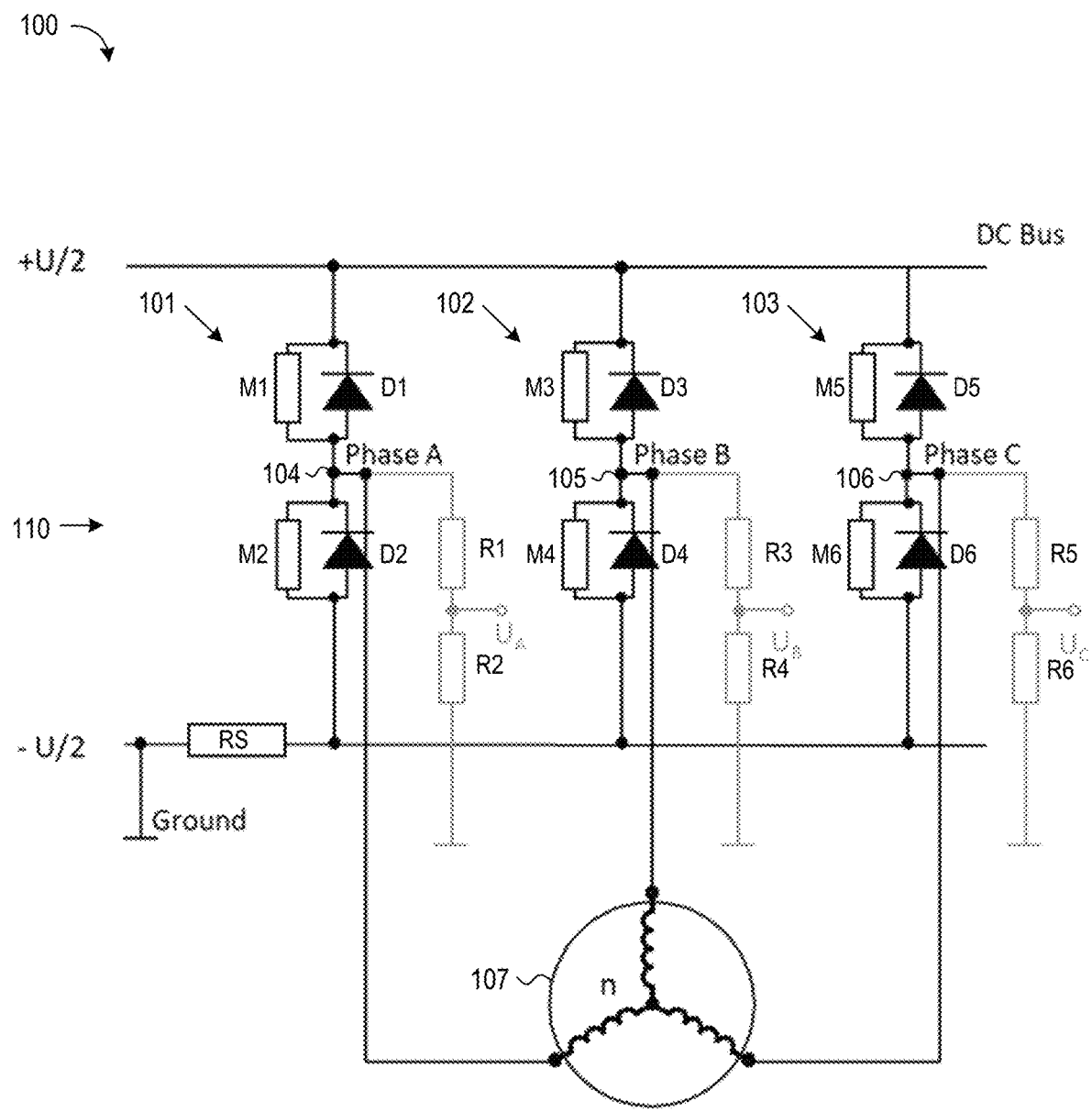
FIG. 1 is a circuit diagram of a motor phase voltage measurement circuit in which the power transistors are turned off to provide high resistance elements.

To provide a contextual understanding for selected embodiments of the present disclosure, reference is now made to FIG. 1 which is a circuit diagram 100 of a motor phase voltage measurement circuit 110 in which a full bridge inverter and resistor divider circuit 101-103 are formed with power transistors M1-M6 (and respective body diodes D1-D6) which are selectively switched to control a multi-phase AC permanent magnet induction motor 107, such as a permanent magnet synchronous motors (PMSM) or brushless DC motors (BLDC) and voltage dividers R1-R6. Each power transistor (M1-D1 to M6-D6) consists of the channel Mx and the body diode Dx. When the power transistors are turned OFF, the channels are considered high resistance. As depicted, the voltage measurement circuit 110 includes first, second and third high-sided switching elements (M1, M3 and M5) and first, second and third low-sided switching elements (M2, M4 and M6). Each switching element may, for example, be an insulated-gate bipolar transistor (IGBT) or a MOSFET transistor. Each depicted switching element (M1-M6) is associated with a corresponding free-wheeling diode (D1-D6). A microcontroller (not shown) may be embodied as a pre-driver circuit to generate six gate control signals for the power transistors M1-M6 which are connected with freewheeling diodes to selectively switch a first supply voltage (e.g., +U/2) and a second supply or ground voltage (−U/2) applied across shunt resistor RS, thereby generating the inverter output phase signals 104-106 which are connected to the PM motor 107, respectively, as phase voltage A, phase voltage B, and phase voltage C. With a "star" configuration for the PM motor 107, the three motor phase signals 104-106 are terminated from the PM 107, while the common point is part of the motor wiring. In operation, the output PWM signals are applied to the gates of the power transistors M1-M6 (one pair for each motor phase) to generate 3-phase inverter output phase signals 104-106. In idle mode, the power transistors M1-M6 are turned OFF so that they have a high-impedance state. As indicated, each of the inverter output phase signals 104-106 is also connected in a resistor divider feedback circuit R1/R2, R3/R4, R5/R6 to generate inducted voltage signals $U_A$, $U_B$, $U_C$ for feedback to the microcontroller. While the depicted inverter 101-106 is a 2-level, 6-transistor inverter, it will be appreciated by those skilled in the art that the principles of the present disclosure are applicable to different inverters, such as 3-level inverters.

Figure 2A:
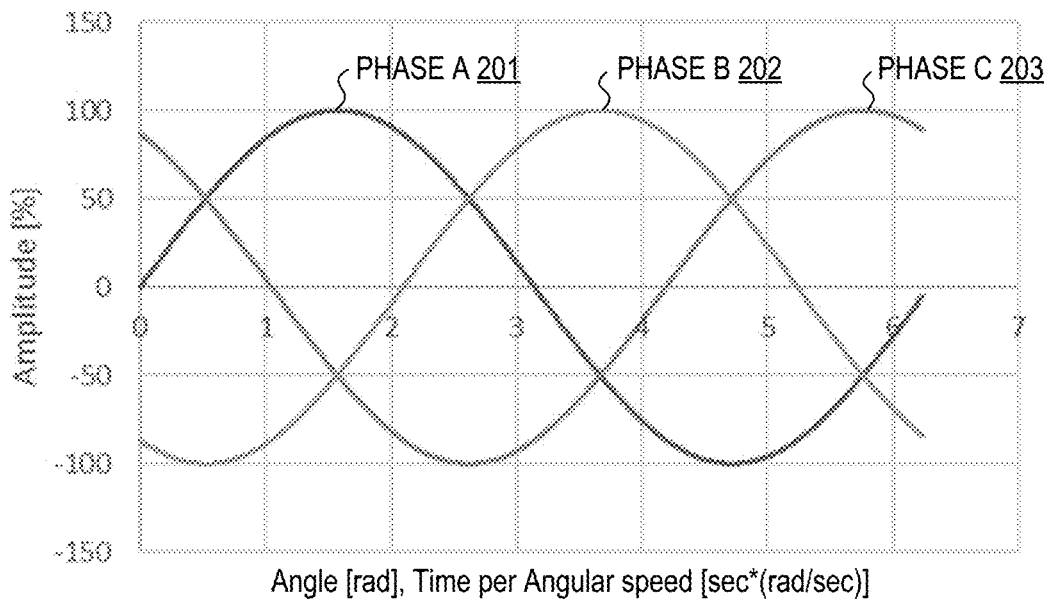
FIG. 2A illustrates the ideal output voltage signals observed in the phase windings of a 3-phase permanent magnet motor.

With AC permanent magnet motors 107, output voltage phase signals 104-106 are induced when the motor is spinning and may be measured by the voltage measurement circuit 110. As illustrated with FIG. 2A, the ideal output voltage signals 201-203 (Phase A, Phase B, Phase C) observed in the phase windings of a 3-phase permanent magnet motor typically have a sinusoidal or quasi-sinusoidal shape, and the number of such signals equals to the number of phases of a motor (e.g., three phases). In accordance with PMSM theory, these voltage signals (Phase A, Phase B, Phase C) are shifted in time in the same way as the three phase windings are distributed in space over the stator of a motor. In addition, the amplitude and frequency of the voltage corresponds to the motor speed, and the voltage space vector position corresponds to the electrical position of the rotor.

Figure 2B:
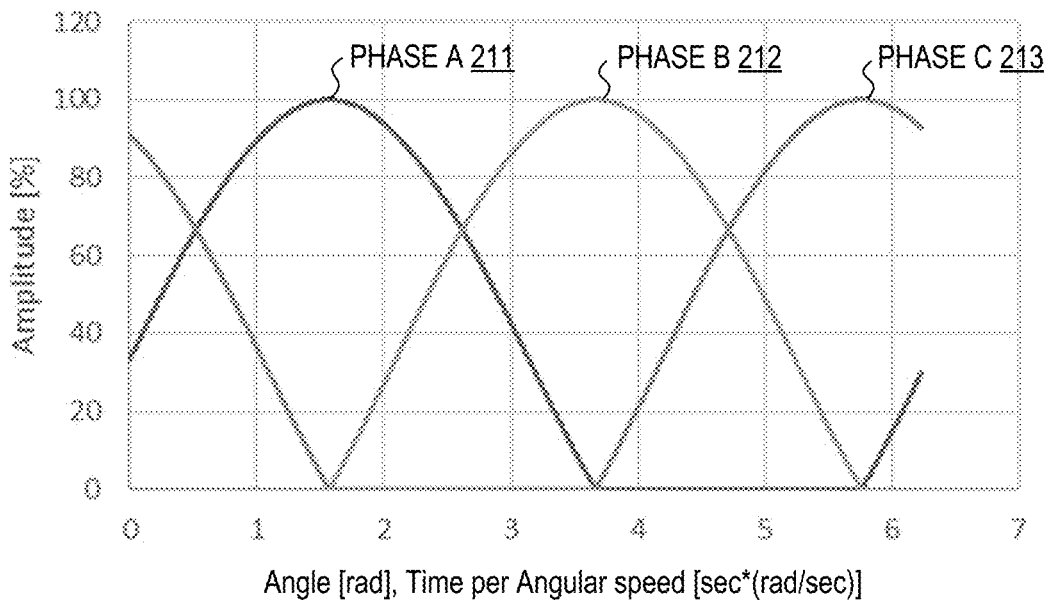
FIG. 2B illustrates the output voltage signals measured by single-ended analog-to-digital converter (ADC).

To obtain the rotor position (and speed), phase voltages can be measured and processed to generate a voltage vector composed from all the induced phase voltages, and then the rotor position can be obtained as a position of the voltage vector. However, there are challenges with sensing the phase voltages which can have variations in amplitude, frequency and DC-offset of the signal. For example, in three phase system signals, the DC offset can be introduced by errors in the three-phase power supply system, by non-symmetrical loads, and/or by the measurement system. With low voltage applications (such as shown in FIG. 1) which measure or sense the induced voltages using a single-ended analog-to-digital converter that is coupled to receive phase voltage output signals from a resistive voltage divider, the sensed voltage signals include a DC-offset due to the floating neutral point of the motor winding and series-parallel connected resistances of the circuitry. An example of such a DC-offset is illustrated in FIG. 2B which shows the output voltage signals 211-213 measured by single-ended analog-to-digital converter (ADC). In this example, the DC offset is created by the design of the hardware circuits to adjust the AC signals for positive-only input of the ADC. In AC motor control applications where a star- or delta-connected motor may induce voltages when forced to spin by external force, the floating center of the winding (actual or virtual) shifts the AC signal referenced to a power converter's grounding by the half of DC-bus voltage.

Conventionally, the DC-offset is compensated by determining the offset prior to activation of the application or by using compensation software and hardware. However, hardware solutions for DC-offset compensation typically include variable time- or temperature-dependent parameters. And most software solutions for DC-offset compensation use a phase-locked loop system which incorporates integration or a PI-controller with a limited time response (frequency characteristics like a low-pass filter). To eliminate the DC offset, low pass filters can also be used to identify and subtract the offset from the original signal, but such software processing are not only computationally complex, but also introduce frequency-dependent response delay.

Figure 3:
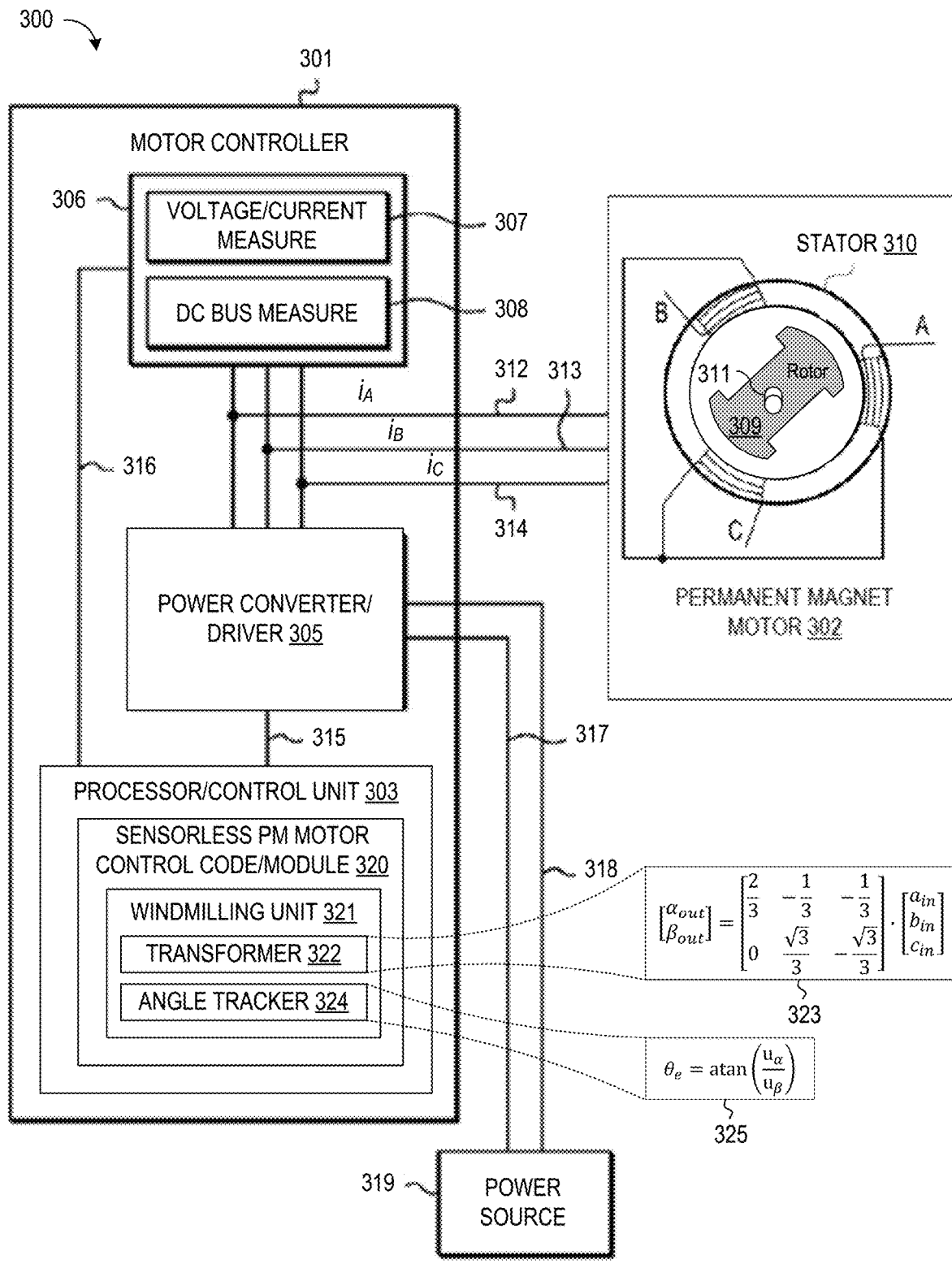
FIG. 3 is a block diagram illustration of an electric motor system comprising a sensorless permanent magnet motor controller in accordance with selected embodiments of the present disclosure.

To address these limitations from conventional solutions and others known to those skilled in the art, reference is now made to FIG. 3 which is a block diagram illustration of an electric motor system 300 which includes a permanent magnet AC motor 302 which is powered and controlled by a motor controller 301 to implement a sensorless startup control technique for on-the-fly start-up of a in accordance with selected embodiments of the present disclosure. As described more fully hereinbelow, the sensorless startup control technique provides zero-delay deterministic way of getting the rotor position (and speed) information from the terminal voltages of the motor 302 by applying a predetermined transformation to a multi-phase vector representation of back-EMF voltages to remove voltage offsets and distortions, and then calculating the rotor position as the angle of the transformed voltage vector. Suitable for most three phase PM AC motor systems, the disclosed sensorless control technique does not require additional hardware as compared to existing three-phase signals acquisition systems which do not provide a variable DC offset elimination. Implemented with a signal processing unit and rotor position detection unit, the disclosed sensorless control technique is able to quickly and accurately detect rotor position information based on a voltage vector transformation which uses simple principles and arithmetic operations without additional filtering for DC offset compensation. While additional processing can be applied, depending on the quality of the signal, the output signal from the voltage vector transformation exactly reflects the input signal in all relevant respects, and compares favorably with conventional Clarke transformation techniques for eliminating DC-offsets to address static and variable DC-offsets, as well as distorted and shifted input signals, such as harmonic signals of a single or multiple even or odd harmonics components.

As depicted, the electric motor system 300 includes a sensorless motor controller 301, a permanent magnet AC motor 302, and power source 319. The motor controller 301 includes a processor control unit 303, power converter/driver circuit 305, and measurement circuits 306. The motor controller 301 is connected to PM motor 302 via one or more conductors 312, 313, and 314 which are also connected to outputs of driver circuit 305 and to inputs of measurement circuits 306. Measurement circuits 306 are connected to processor 303 via one or more connection lines 316 to provide measurements from measurement circuits 306 to processor 303. Processor 303 is connected to driver circuit 305 via one or more connection lines 315 to allow processor 303 to control driver circuit 305. Power source 319 is connected to driver circuit 305 via AC or DC conductor lines 317, 318 to provide power for driver circuit 305 to apply to the motor 302. Alternatively, the power source can be provided with more than 2 line outputs, for example 3-phase system with three lines (L1, L2, L3) or four lines (L1, L2, L3, N) or with a DC bus current ($I_{DC\_Bus}$) conductor.

Measurement circuits 306 can obtain measurements of current and/or voltage parameters for the PM motor 302. Voltage/current measurement circuit 307 can measure one or more phase voltages $U_A$, $U_B$ and $U_C$ or motor currents $i_A$, $i_B$ and $i_C$ and/or phase voltages $U_A$, $U_B$ and $U_C$ detected at the conductor(s) 312-314. In addition, the current measurement circuit 307 can obtain current measurements of motor 302, such as measured current drawn from the DC bus ($I_{DC\_Bus}$) that is detected at the conductor lines 317, 318. In similar fashion, DC bus measurement circuit 308 can obtain one or more DC bus voltage and/or current measurements from PM motor 302. Each of voltage/current measurement circuit 307 and DC bus measurement circuit 308 can obtain a plurality of measurements, for example, with respect to the plurality of conductors 312-314. Thus, for example, multiple phase (e.g., three-phase) motors can be controlled. Measurements can be, for example, complex measurements, which can include a direct component and a quadrature component sampled 90 degrees of phase away from the direct component. The measured current and/or voltage values captured by the measurement circuit 306 are connected over one or more connection lines 316 to processor 303.

Electric motor system 300 can be implemented to control operation of various types of PM motors 302, such as permanent magnet synchronous motors (PMSM), using suitable control instructions that are executed by processor 303. As will be appreciated, different components can be used in the driver circuit 305 to drive different motor types. For example, components compatible with voltages of different polarities can be used to implement driver circuit 305 for AC motors. Different components can be used in measurement circuits 306 to measure currents and voltages of different motor types. In the case of an alternating current (AC) motor, measurement circuits 306 can be capable of measuring both AC and DC voltages or current signals. In accordance with at least one embodiment, DC bus measurement circuit 308 may be implemented generally as a voltage measurement circuit not specifically limited to DC or AC voltage measurement.

In accordance with the embodiments shown in FIG. 3, the measurement circuits 306 may include a current or voltage measurement circuit 307 for measuring the motor currents $i_A$, $i_B$ and $i_C$ and/or phase voltages $U_A$, $U_B$ and $U_C$ at the conductor(s) 312-314. In addition, the measurement circuits 306 may include a direct current (DC) bus measurement circuit 308 for measuring the DC bus voltage and/or DC bus current. Motor 302 includes a rotor 309, stator 310, and shaft 311 that is mechanically coupled to rotor 309. In the motor 302, multiphase AC electromagnets on the stator 310 create a magnetic field which rotates in time with the oscillations of the line current. The rotor 309 with permanent magnets or electromagnets turns in step with the stator field at the same rate, and as a result, provides the second synchronized rotating magnet field of the motor 302. Because of the constant magnetic field in the rotor 309, induction windings cannot be used for starting PM motors 302, so a variable-frequency power source may be used to start the motor.

In normal operation, the processor control unit 303 calculates and sends control signals 315 for power switches (e.g., transistors) to the power converter driver 305 which generates the desired output voltages to the motor terminals 312-314. The only feedback signals are usually the motor currents $i_A$, $i_B$, $i_C$ and/or phase voltages $U_A$, $U_B$ and $U_C$, which are partially or together used for rotor speed and position estimation or detection. There may also be one or more auxiliary signals (e.g., motor temperature, noise or vibrations sensors) which may be relevant to the motor controller 301 or the entire system 300. During normal operation, the sensorless PM motor controller 320 may be configured to detect the rotor position using the motor terminal voltages with a multi-step sensorless commutation detection on unpowered phases, provided that the measurement circuit 306 includes motor terminal voltage sensing circuitry 307.

In an idle mode, all the switches of the power converter 305 are usually turned OFF to the high-impedance state, but the motor terminal voltages can still be measured or sensed, such as by using, for example, a resistive voltage divider and a single-ended analog-to-digital converter. In the example circuit shown in FIG. 1, the power converter switches MOSFETS M1-M6 are switched OFF in the idle mode state. In this state, the voltages on the power converter terminals 312-314 (and the motor input terminals) are measured by the voltage measure circuit 306 which includes one voltage divider per motor phase. Considering a symmetrical motor, a reduced number of voltage dividers may be used as well. In the example circuit shown in FIG. 1, the voltage divider is formed with the resistors R1-R6 which are set up by the turned-off power switches M1-M6 and other circuits, such as a single-ended ADC (not shown) connected to the DC-bus voltage. When the power switches M1-M6 are turned OFF, voltage divider R1-R6 effectively introduce a DC offset to the measured motor terminal voltages, the single-ended ADC cannot "see" negative signals and the resulting digital signal is distorted as depicted in FIG. 2B.

Another component to the sensed motor terminal voltage(s) is the electromotive force (EMF) voltage induced by a rotating rotor of a permanent magnet motor. The EMF voltage is typically a sinusoidal signal having an amplitude and frequency that respond to the rotor speed. While there is no high current path in the idle mode, the voltage measure circuit 306 can sense the EMF voltage component. If more than one phase voltage is measured, a combination of multiple signals can be treated as a set of components of a voltage vector in space, where the resulting voltage vector is aligned with the rotor position. However, due to the signal shape and possible distortion present in the voltage vector that is sensed from motor terminal voltages in an idle state of the power converter, signal processing is needed to eliminate DC-offset errors before the rotor position and speed is detected.

To provide a rotor position detection functionality which removes DC offsets from the motor phase voltages when the power converter/driver 305 is not activated, the processor 303 includes the sensorless PM motor control code module 320 which may be implemented in software, firmware or control code logic accessing from memory which stores programming instructions to be executed to configure the processor 303 into a machine that controls the PM motor 302 as disclosed herein. As will be appreciated by those skilled in the art, the described functionality of the sensorless PM motor control may also be implemented with hardware circuits or a combination of hardware and software. In whatever form implemented, the sensorless PM motor controller 320 may include a windmilling unit or module 321 for monitoring and transitioning to active control of a spinning PM motor 302. In selected embodiments, the sensorless PM motor controller 320 includes a signal processing unit or module 322 which transforms or projects a three-phase vector representation of the input signal voltages into an orthogonal system using a Clarke transform (with zero-component neglected) or a "beta projection" to remove any DC offset, thereby determining the vector position of the input signals with the offset removed. In selected embodiments, the transformation performed by the signal processing unit/module 322 applies a non-linear transform 323 which uses the only alpha and beta components of a Clarke transform to a 3-phase input signal $[a_{in}, b_{in}, c_{in}]$ to generate a 3-phase output signal $[\alpha_{out}, \beta_{out}]$, the zero-component of the Clarke transform is neglected. This technique is also referred as "beta projection", since the same effect is achieved in three-phase to three-phase transform using a combination of three beta-components of the Clarke transform as described by Equations (5) to (8). In terms of resulting "alpha" and "beta" components, a Clarke transform and a "beta projection" are the same, thus considered replaceable. However, a "beta projection" is preferred as the complexity lower.

As explained above, the DC offset components in the measured motor terminal voltages can vary with the rotor speed, AC signal, and other motor parameters. To account for this distortion when detecting the rotor position from the motor terminal voltages, the transformer unit 322 provides DC offset removal/compensation signal processing that has a fast-dynamic response and low processing complexity to produce a transformed voltage vector which can be further processed with conventional vector processing techniques and reducing negative impacts to the system performance. While the DC offset removal/compensation signal processing is described herein with reference to a 3-phase drive for a PM AC motor, it will be appreciated that the same approach can be derived for two-phase or multi-phase motors as well.

In selected embodiments, the transformer unit 322 is connected to receive a three phase AC signal shifted by an unknown DC offset as the input signal for DC offset processing. The desired output signal is the AC component of the signal with the DC offset component removed by applying a DC offset algorithm that is not just a linear transform of the original input signal. By removing the DC offset from the input signal, the output signal can be used for determining the position of the voltage vector.

As shown in Equation (1), the input signal is described by three phase quantities shifted apart of each other by 120 degrees, introducing an offset in the signal.

$$a_{in} = [a + \text{offset}],$$

$$b_{in} = [b + \text{offset}],$$

$$c_{in} = [c + \text{offset}] \tag{1}$$

The three-phase vector represented by $[a_{in}, b_{in}, c_{in}]$ is then transformed into an orthogonal system using a modified version an $\alpha\beta\gamma$ transform (also known as the simplified Clarke transform) where only the beta component is used. As shown in Equation (2), the beta component is calculated as follows:

$$\beta_1 = \frac{1}{\sqrt{3}}(b_{in} - c_{in}) \tag{2}$$

Using the substitution from Equation (1), the beta component equation changes Equation (2) into:

$$\beta_1 = \frac{1}{\sqrt{3}}([b + \text{offset}] - [c + \text{offset}]) \tag{3}$$

When the parenthetical terms are combined, the beta component calculation in Equation (3) becomes:

$$\beta_1 = \frac{1}{\sqrt{3}}(b + \text{offset} - c - \text{offset}) = \frac{1}{\sqrt{3}}(b - c) \tag{4}$$

As shown in Equation (4), the beta component always neglects the offset component, provided that the offset is considered the same for all the three components $a_{in}$, $b_{in}$ and $c_{in}$.

With the foregoing in mind, a virtual three-phase system can be created using three beta components $\beta_1$, $\beta_2$ and $\beta_3$ calculated as follows:

$$\beta_1 = \frac{1}{\sqrt{3}}(b_{in} - c_{in}) \tag{5}$$

$$\beta_2 = \frac{1}{\sqrt{3}}(c_{in} - a_{in})$$

$$\beta_3 = \frac{1}{\sqrt{3}}(a_{in} - b_{in})$$

Since this virtual system is shifted in space by 90 degrees from the original $a_{in}$, $b_{in}$ and $c_{in}$ system, the shift may be eliminated by first applying a simplified forward Clarke transform, as shown in Equation (6):

$$\alpha = \beta_1 \quad (6)$$

$$\beta = \frac{1}{\sqrt{3}}(\beta_2 - \beta_3)$$

Next, the inverse Clarke transform is applied with reordered components to eliminate the shift, as shown in Equation (7):

$$a_{out} = -\beta \quad (7)$$

$$b_{out} = \frac{1}{2} \cdot \beta - \frac{\sqrt{3}}{2} \cdot \alpha$$

$$c_{out} = \frac{1}{2} \cdot \beta + \frac{\sqrt{3}}{2} \cdot \alpha$$

Combining the equations above into one transform, the resulting output signal equations are shown in Equation (8):

$$a_{out} = \tfrac{1}{3} \cdot (2 \cdot a_{in} - b_{in} - c_{in})$$

$$b_{out} = \tfrac{1}{3} \cdot (2 \cdot c_{in} - a_{in} - b_{in})$$

$$c_{out} = \tfrac{1}{3}(2 \cdot b_{in} - c_{in} - a_{in}) \quad (8)$$

The equations shown in Equation (8) may be represented in matrix operations convention as:

$$\begin{bmatrix} a_{out} \\ b_{out} \\ c_{out} \end{bmatrix} = \begin{bmatrix} \tfrac{2}{3} & -\tfrac{1}{3} & -\tfrac{1}{3} \\ -\tfrac{1}{3} & -\tfrac{1}{3} & \tfrac{2}{3} \\ -\tfrac{1}{3} & \tfrac{2}{3} & -\tfrac{1}{3} \end{bmatrix} \cdot \begin{bmatrix} a_{in} \\ b_{in} \\ c_{in} \end{bmatrix} \quad (9)$$

In addition to performing 3-phase to 3-phase transformations, the signal processing unit/module 322 can be adapted to perform 3-phase to 2-phase transformations by apply asymmetrical Clarke transform, as shown in Equation (10):

$$\begin{bmatrix} \alpha_{out} \\ \beta_{out} \end{bmatrix} = \begin{bmatrix} \tfrac{2}{3} & -\tfrac{1}{3} & -\tfrac{1}{3} \\ 0 & \tfrac{\sqrt{3}}{3} & -\tfrac{\sqrt{3}}{3} \end{bmatrix} \cdot \begin{bmatrix} a_{in} \\ b_{in} \\ c_{in} \end{bmatrix} \quad (10)$$

As will be appreciated, equation (10) is an adaption of the full Clarke transform with the zero component neglected or removed, also referred as a "beta projection". As disclosed herein, the signals $\alpha_{out}$, $\beta_{out}$ are components of an orthogonal system, where the transformed output signal $\alpha_{out}$ is aligned with the input signal $\alpha_{in}$. As a result and as described more fully hereinbelow, the transformed output signal $\alpha_{out}$ can be used to determine the vector position of the $a_{in}$, $b_{in}$, $c_{in}$ system. As a result of the DC offset processing by the transformer unit 322, the transformed output signals have no offset (even if the original offset is variable), so the position of the output vector is the same as the position of the input vector. In addition, the DC offset processing by the transformer unit 322 also transforms any 3-phase symmetrical harmonic components (harmonic components present in all three phases) as well. As a result, dynamic response of the DC offset processing calculation is immediate with no additional delay in position detection (zero-order system).

Once the transformed voltage vector is generated by the transformer/signal processing unit 322, the sensorless PM motor controller 320 may use an angle tracker unit or module 324 to process the transformed voltage vector to calculate a rotor position in time. In selected embodiments, the angle tracker unit or module 324 exploits the fact that, by definition, the rotor position is aligned with so-called "direct axis," which is placed in the position of the maximal flux of the rotor permanent magnets. As shown in Equation (11), the EMF voltage is generated by the spinning rotor as a change of the magnetic flux through the coils over time:

$$\begin{bmatrix} u_A \\ u_B \\ u_C \end{bmatrix} = \frac{d}{dt} \psi_{PM} \begin{bmatrix} \cos(\theta_e) \\ \cos\left(\theta_e - \tfrac{2}{3}\pi\right) \\ \cos\left(\theta_e + \tfrac{2}{3}\pi\right) \end{bmatrix} \quad (11)$$

where $\theta_e$ is the electrical rotor position (used for controlling the motor), $\psi_{PM}$ is the flux of permanent magnets, and $U_A$, $u_B$, $u_C$ are the motor terminal voltages. As shown in Equation (12), the motor terminal voltage equations can be simplified as:

$$\begin{bmatrix} u_A \\ u_B \\ u_C \end{bmatrix} = -\omega \cdot \psi_{PM} \begin{bmatrix} \sin(\theta_e) \\ \sin\left(\theta_e - \tfrac{2}{3}\pi\right) \\ \sin\left(\theta_e + \tfrac{2}{3}\pi\right) \end{bmatrix} \quad (12)$$

where $\omega$ is the electrical rotor speed. The resulting voltage vector $U = [u_A, u_B, u_C]$ represents the EMF voltage of the 3-phase AC permanent magnet motor which has a rotor spinning with the angular speed $\omega$ and a rotor position (angle) $\theta_e$.

As will be appreciated, the opposite polarity of the voltages in Equation (12) is a matter of consensus of the model. However, it can be seen that the rotor position can be easily determined by calculating the angle of the resulting vector $U = [u_A, u_B, u_C]$. To simplify the calculations, the Clarke transform can be performed and just two components can be used to calculate the vector position as follows:

$$\theta_e = \operatorname{atan}\left(\frac{u_\alpha}{u_\beta}\right) \quad (13)$$

As seen from the foregoing, the angle tracking performed by the angle tracker unit/module 324 may be implemented by computing the rotor position or angle $\theta_e$ of the transformed voltage vector $U = [u_A, u_B, u_C]$. To simplify the calculations, the angle tracker unit/module 324 may perform the computation of $\theta_e$ 325 by applying the Clarke transform and using only two components to calculate the vector position (e.g., $\theta_e = \operatorname{atan}(u_\alpha/u_\beta)$).

Once the rotor position $\theta_e$ is known from Equation (13), the electrical rotor speed $\omega_e$ can be calculated either by derivation of the rotor position (and additional filtering) or using a tracking observer (or similar technique). For example, the windmilling unit or module 321 may be configured to calculate the rotor angular speed (electrical) by computing $$\omega_e = \frac{d\theta_e}{dt}.$$

With this information, the sensorless PM motor controller 320 may be configured to initialize the observers and PI controllers with the required startup information (e.g., EMF voltages, currents, rotor position, rotor speed, etc.) to reflect the current rotor position and speed before activating the power converter 305 to enable generation of PWM signals 312-314 for the motor 302.

Figure 4A:
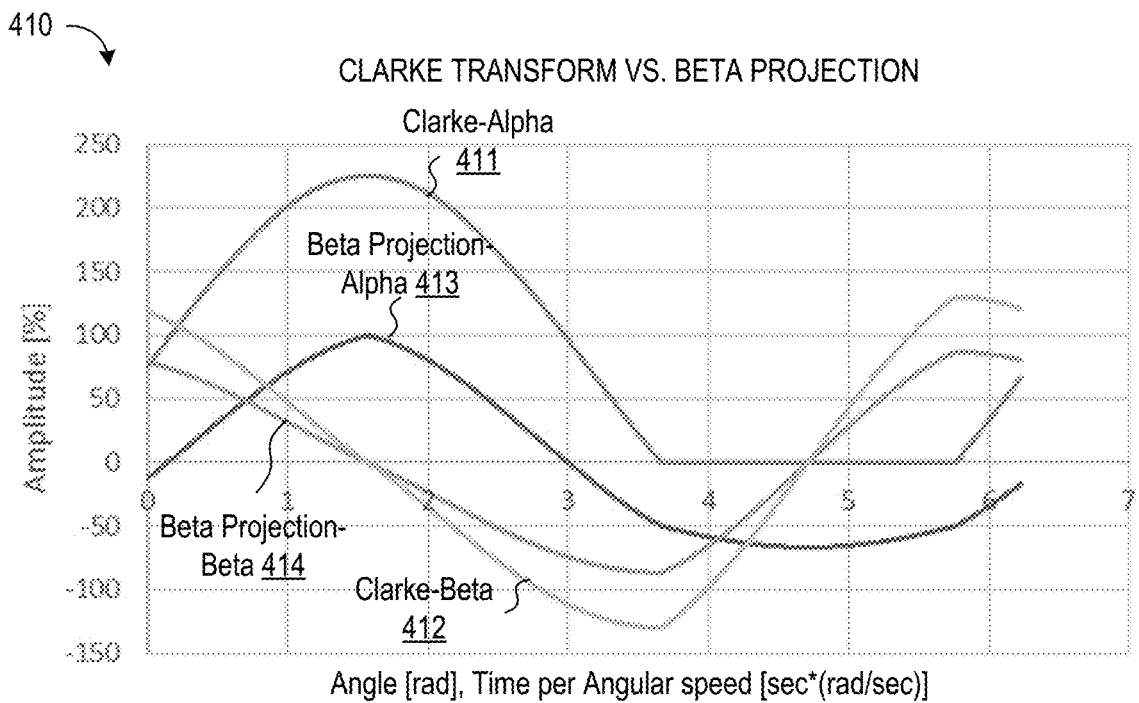
FIG. 4A illustrates a timing voltage waveform comparison of output voltage waveforms from a simplified Clarke transform where the zero component is assumed negligible and the output voltage waveforms of the beta-projection Clarke transform where the zero component is significant but removed in accordance with selected embodiments of the present disclosure.

To provide additional details for an improved understanding of selected embodiments of the present disclosure, reference is now made to FIG. 4A which depicts a timing voltage waveform comparison 410 of conventional Clarke transform output voltages and beta-projection output voltages generated from the transformer 322 in accordance with selected embodiments of the present disclosure. In particular, the waveforms 411, 412 represent "alpha" and "beta" projection results, respectively, of applying a simplified Clarke (or aft) space vector transformation of time-domain motor terminal voltage signals from a three-phase coordinate system (abc) into a stationary two-phase reference frame ($\alpha\beta$). In contrast, the waveforms 413, 414 respectively represent the "alpha" and "beta" signals results (e.g., $u_\alpha$, $u_\beta$) of applying a "beta projection" or neglects the zero component of Clarke transform ($\alpha\beta 0$), as disclosed herein.

Figure 4B:
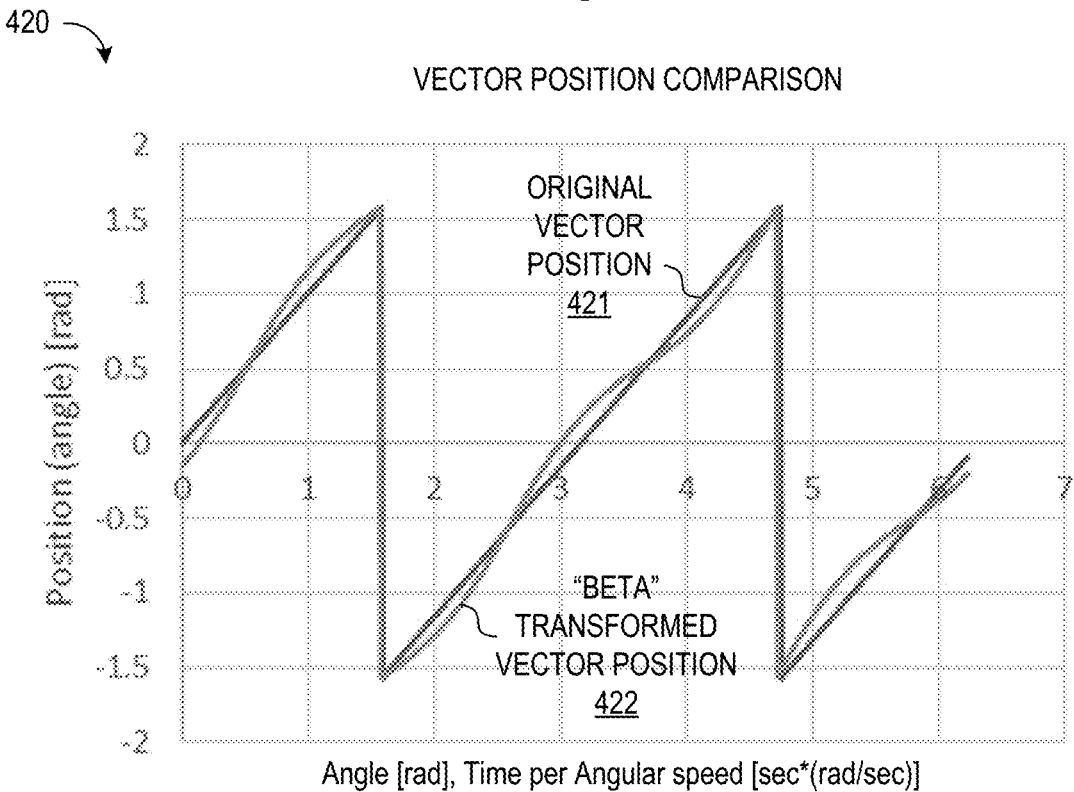
FIG. 4B is a vector position comparison of the original vector position and beta-projected vector position in accordance with selected embodiments of the present disclosure.

As seen with the vector position comparison 420 depicted in FIG. 4B, the computation of the vector position 422 based on the "beta projection" disclosed herein compares very favorably with the actual vector position 421. In particular, the angle tracker unit or module 324 may be configured to compute the "beta" transformed vector position 422 from the "alpha" and "beta" projection results (e.g., $u_\alpha$, $u_\beta$) 413, 414 shown in FIG. 4A by calculating the arc tangent (atan) of the quotient $u_\alpha/u_\beta$ the arctan waveform transform which is an estimate of the original vector position and beta-projected vector position in accordance with selected embodiments of the present disclosure. In comparison to the original vector position 421, it can be seen that there is a very small difference or error measure with respect to the "beta" transformed vector position 422.

Indeed, there are a variety of distortions and offsets on the input motor terminal voltage signals where the computation of the "beta" transformed vector position as disclosed herein also compares favorably to the computation of the space vector position using the "alpha" and "beta" components of the simplified Clarke (or aft) space vector transformation. The conventional Clarke transform ($\alpha\beta 0$) provides similar results as the "beta projection", but because of the zero-component calculation, it requires more mathematical operations to provide results, and the DC offset and some higher order harmonics are transformed in the zero component. Assuming symmetrical and zero-offset system, the simplified Clarke transform may be used as defined in Equation (6), but the DC offset and all the harmonic components are presented in the "alpha" component. That means that, for symmetrical systems with no DC-offset, the results of the "beta projection", simplified and conventional Clarke transform are the same. For example, there is no significant difference between the "beta projection" and conventional Clarke transform for input motor terminal voltage signals that are purely symmetrical sinusoidal signals, but the "beta projection" is not sensitive to DC-offset components, and therefore provides better performance than the simplified Clarke transform for input motor terminal voltage signals that are detected from single-ended ADC inputs. In addition, there is no difference between the "beta projection" and simplified Clarke transform for input motor terminal voltage signals that include Prime-number-order harmonics ($2^n$, $5^n$, $7^n$, $11^n$, . . . ), but the "beta projection" suppresses N$\times 3^{rd}$ harmonics contained in the input motor terminal voltage signal. Since PM motors typically include mainly $1^{st}$ and N$\times 3^{rd}$ harmonics, the ability to derive the space vector position with low CPU requirements and with no attenuation in phase or amplitude as disclosed herein makes this technique well suited for such motors. In conventional Clarke transform, these harmonics are included in the zero component, which is neglected in "beta projection".

Figure 5:
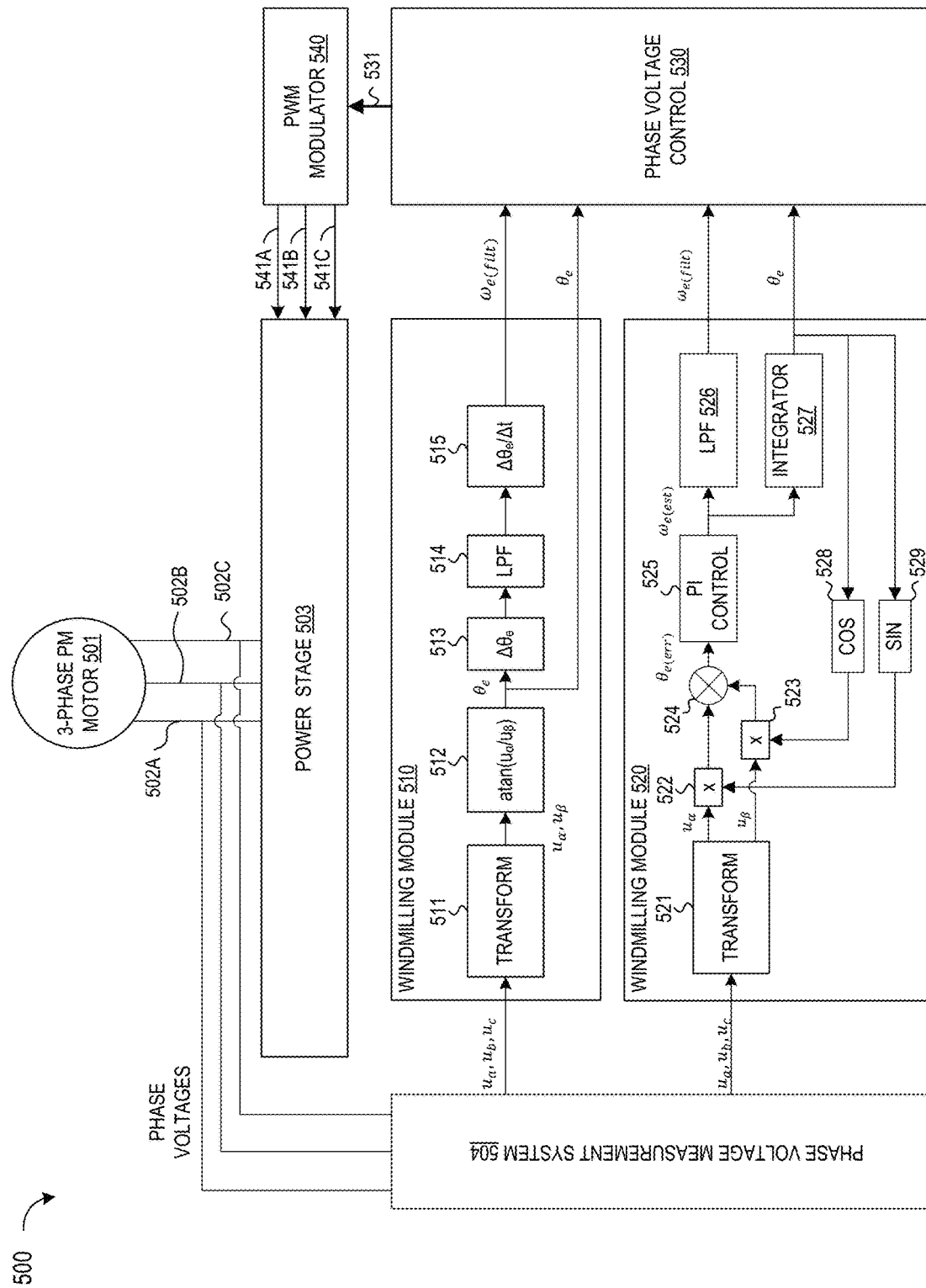
FIG. 5 is a block diagram of a sensorless system for implementing on-the-fly start-up of a permanent motor alternating current motor in accordance with selected embodiments of the present disclosure.

To provide additional details for an improved understanding of selected embodiments of the present disclosure, reference is now made to FIG. 5 which depicts a block diagram of a sensorless system 500 for implementing on-the-fly start-up of an electric motor. The disclosed system 500 has an electric motor 501 which may be embodied as a 3-phase AC permanent motor. The sensorless system 500 also includes a motor driver which may be embodied with a driver power stage hardware 503 having three outputs 502A-C coupled to terminals of the electronic motor 501. In selected embodiments, the driver power stage hardware 503 may be implemented with a pre-driver circuit (such as, for example, the GD3000 driver manufactured by NXP Semiconductors) and bridge inverter circuit which uses a plurality of power transistors to selectively couple a supply voltage and ground voltage inputs to the three outputs 502A-C in response to PWM gate control signals 541A-C generated by the PWM modulator 540.

In normal operation, the PWM modulator hardware 540 generates the PWM gate control signals 541A-C so that the driver power stage hardware 503 energizes motor voltage phases that may be applied to the 3-phase PM motor 501. However, in idle mode, the switches of the driver power stage hardware 503 are turned OFF and are in a high-impedance state. In this idle state, the voltages on the power stage terminals 502A-C are measured at the phase voltage measurement system 504 as a combination a DC offset component and an electromotive force (EMF) component induced by a rotating rotor of the motor 501. For example, the voltages on the power stage terminals 502A-C may be measured at the phase voltage measurement system 504 with a voltage divider (e.g., R1-R6) which is connected to measure multiple phase voltages for combination into a voltage space vector [$u_a$, $u_b$, $u_c$].

To control the timing and application of the PWM gate control signals 541A-C during on-the-fly startup when the power stage 503 is not yet active, the disclosed system 500 includes a windmilling module, such as the first windmilling module 510 or second windmilling module 520, either of which may be used in different or alternative embodiments. As illustrated, the windmilling module 510 is connected to receive and detect information representing the motor's phase voltage input signals in the form of a voltage vector [$u_a$, $u_b$, $u_c$] and to apply a non-linear transformation of the observed phase voltages 502A-C when calculating the rotor position $\theta_e$ and rotor speed $\omega_e$. Alternatively, the windmilling module 520 may be connected to receive the motor's phase voltage input signal voltage vector [$u_a$, $u_b$, $u_c$] and to generate therefrom the rotor position $\theta_e$ and rotor speed $\omega_e$.

For example, the first windmilling module 510 may use a control algorithm which applies a non-linear transform module 511 to remove offsets and to decrease the impact of the signal deformation from the input voltage vector, thereby generating a two-phase output signal $u_\alpha$, $u_\beta$. In selected embodiments, the transform module 511 may transform the input voltage vector [$u_a$, $u_b$, $u_c$] into an orthogonal system by applying a "beta projection" (Clarke transform without its zero component) to effectively remove the DC offset components from the input voltage vector when generating the transformed voltage vector [$u_\alpha$, $u_\beta$]. At the rotor position detection unit 512, the position of the transformed voltage vector is determined by calculating the angle of the input voltage vector [$u_a$, $u_b$, $u_c$]. In selected embodiments, the rotor position detection unit 512 calculates the electrical rotor position $\theta_e$ using just two components of the Clarke transformed voltage vector [$u_\alpha$, $u_\beta$] using the equation $\theta_e$=atan($u_\alpha/u_\beta$). By tracking the rotor position information over time with the tracking module 513 and applying a low pass filter 514, the electrical rotor speed worth) can be calculated at the rotor speed unit 515 for output to the phase voltage controller 530 with the electrical rotor position $\theta_e$.

In another example embodiment, the second windmilling module 520 may use a phase-locked loop to derivation of the rotor position and speed from the input voltage vector [$u_a$, $u_b$, $u_c$]. In this alternative embodiment, the second windmilling module 520 may use a control algorithm which applies a non-linear transform module 521 to separately generate the two-phase output signals $u_\alpha$, $u_\beta$ to remove the DC offsets and to decrease the impact of the signal deformation. In selected embodiments, the transform module 521 may transform the input voltage vector [$u_a$, $u_b$, $u_c$] into an orthogonal system by applying a "beta projection" (Clarke transform without its zero component) to effectively remove the DC offset components from the input voltage vector when generating the transformed voltage vector [$u_a$, $u_{fi}$]. At the phase-locked loop (PLL) system 522-529, estimated rotor position $\theta_e$ and speed $\omega_e$ values are calculated from the transformed voltage vector components $u_\alpha$, $u_\beta$. The idea behind the PLL 522-529 is that the sine of the difference between the actual input vector B and its estimate $\theta_e$ can be reduced to zero using for example a proportional-integral (PI) controller 525, thus locking the detected phase to the actual angle. For example, the first transformed output signal $u_\alpha$ is multiplied 522 by the sine 529 of the estimated rotor position $\theta_e$ to give $u_\alpha \sin(\theta_e)$. Similarly, the second transformed output signal $u_\beta$ is multiplied 523 by the cosine 528 of the estimated rotor position $\theta_e$ to give $u_\beta \cos(\theta_e)$. At the differential circuit 524, an error term is calculated as $\theta_{e(err)}=u_\beta \cos(\theta_e)-u_\alpha \sin(\theta_e)$. A proportional integral (PI) controller 525 is used such that the error term ($\theta_{e(err)}$) is forced to zero, thereby generating and estimated rotor speed $\omega_{e(est)}$. At the integrator 527, the estimated frequency $\omega_{e(est)}$ integrated to obtain the angle $\theta_e$. In addition, the estimated is rotor speed $\omega_{e(est)}$ is supplied to the low pass filter 526 to generate the electrical rotor speed $\omega_{e(filt)}$. In this example, PI controller 525 is used, however, other types/structures of controllers may be used to force the error term to zero.

As seen from the foregoing, either of the windmilling modules 510, 520 may be used to compute the rotor speed $\omega_{e(filt)}$ and rotor position $\theta_e$ values from the sensed machine stator voltages. Once the rotor position and speed are computed, the 3-phase permanent magnet motor 501 may be started or restarted on-the-fly by the phase voltage controller 530 using any suitable (re)start sequence. For example, the phase voltage controller 530 may use the estimated rotor position and speed values $\omega_{e(filt)}$, $\theta_e$ to initialize the required state variables of control algorithms of the observers and PI controllers to the current known state before activating the PWM modulator 540 and power stage 503 to generate PWM gate control signals 541A-C for use in beginning sensorless field oriented control (FOC) operations.

Figure 6:
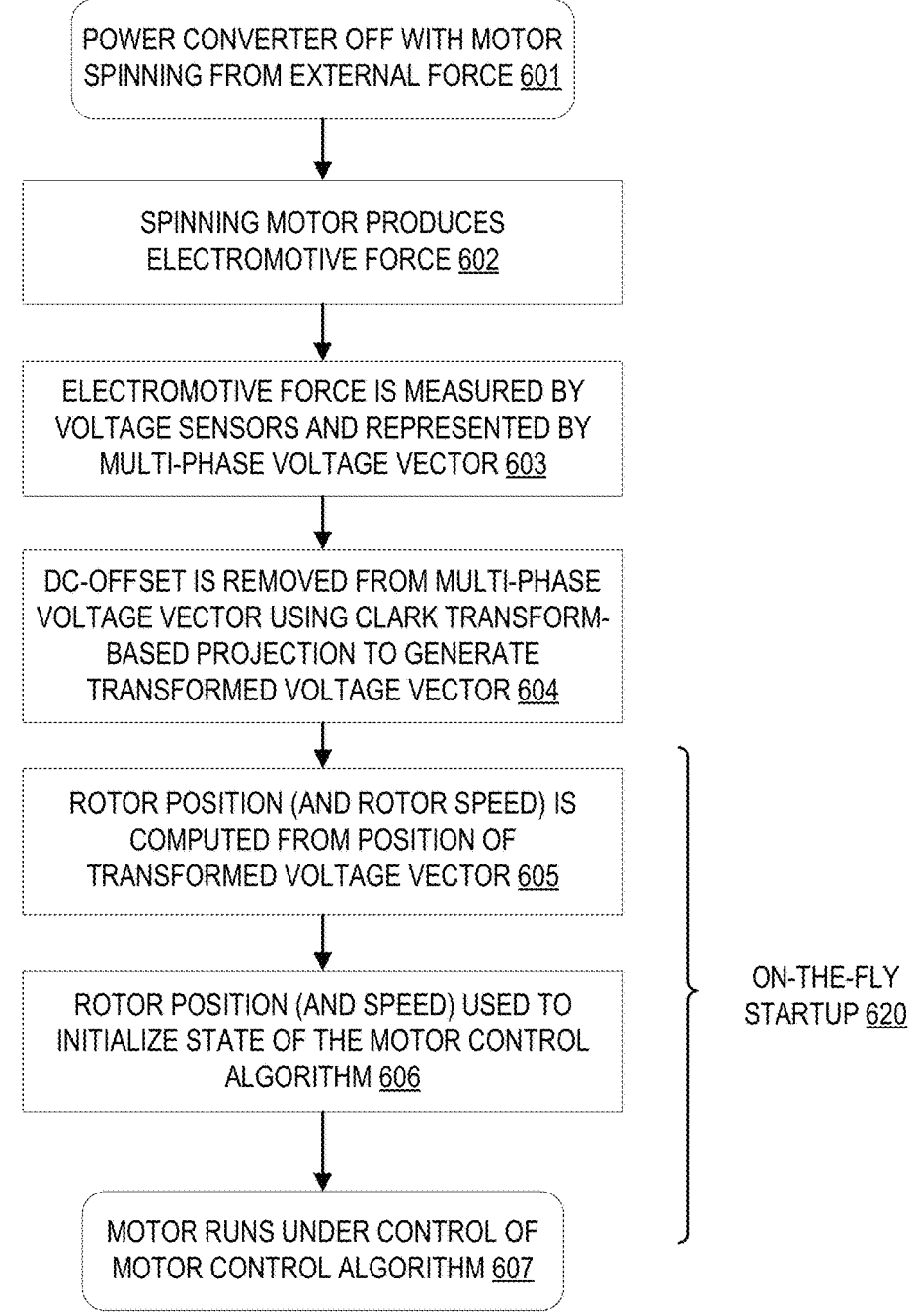
FIG. 6 depicts a simplified flow chart showing the logic for a sensorless method for controlling a permanent motor alternating current motor in accordance with selected embodiments of the present invention.

Turning now to FIG. 6, there is illustrated a simplified flow chart sequence 600 showing the logic for a sensorless method for controlling on-the-fly startup of a permanent motor alternating current motor in accordance with selected embodiments of the present invention. At step 601, the method starts in an initial state when the power converter is OFF and when the motor is spinning in response to an external force, such as wind. For example, a "power on" or "hardware reset" event may trigger an initialization state where the system peripherals and applications are reset and configured. In this initial state 601, the power converter is initially not active but the rotor may be spinning in response to an external force (e.g., wind or a blower) or after the power converter has been stopped and the rotor is still spinning due to inertia. This situation may be figuratively described as the windmilling.

At steps 602-605, the measured motor terminal phase voltages on the multi-phase motor are used to determine the rotor position (and optionally the rotor speed) by applying the windmilling algorithm 610 which efficiently removes fixed and/or variable DC-offset components from the measured motor terminal phase voltages with a "beta projection" (modified Clarke transform projection) which provides a fast-dynamic response and minimal computational complexity to reduce negatives impacts to the system performance. Generally speaking the windmilling algorithm 610 is the detection phase of the sensorless control method 600 which uses the techniques described hereinabove to determine at least the rotor position. As will be appreciated, the windmilling algorithm 610 may be used as a stand-alone monitoring system to monitor the motor state, even if not used to start the motor while spinning.

As disclosed herein, the windmilling algorithm 610 may start at step 602 when the spinning motor produces an electromotive force. Depending on the control structure used for the motor control, the generated electromotive forces are measured at step 603 while the power converter is still OFF, such as by using voltage sensors to measure and represent the electromotive forces with multi-phase voltages in a multi-phase voltage vector. For example, EMF voltages may be sensed using a resistive voltage divider and a single-ended analog-to-digital converter. As will be appreciated, such a measurement setup can introduce a DC-offset component to the EMF voltages due to the floating neutral point of the motor winding and series-parallel connected resistances of the circuitry. As will be appreciated, the DC-offset component can be a fixed offset or a time-varying offset, and there may also be offset contributions from distortions in the measured motor terminal phase voltages, including harmonic input signal components.

At step 604, the DC-offset component is removed from the multi-phase voltage vector by using a specified projection to generate a transformed voltage vector. In selected embodiments, the projection performed at step 604 uses a "beta projection" (Clarke transform with neglected zero component) to project the multi-phase voltages to a transformed voltage vector in an orthogonal vector space where the DC-offset component does not appear. In selected embodiments, the Clarke transform-based projection performed at step 604 uses a simplified Clarke transform, the "beta projection", which generates a 2-phase output $u_\alpha$, $u_\beta$ that does not include the zero component of the Clarke transform (also known as the $\alpha\beta\gamma$ or $\alpha\beta0$ transform) according to Equation (10).

At step 605, the rotor position may be computed from the position of the transformed voltage vector generated at step 604. In selected embodiments, the rotor position $\theta_e$ is computed using only two components from the transformed voltage vector ($u_\alpha$, $u_\beta$), such as by calculating the vector position as the arc tangent (atan) of the quotient $u_\alpha/u_\beta$ (e.g., $\theta_e=\text{atan}(u_\alpha/u_\beta)$). In addition, the rotor speed $\omega_e$ may be computed by derivation of the rotor position (and additional filtering) or using a tracking observer (or similar technique).

At steps 605-607, the rotor position (and optionally the rotor speed) are used in the on-the-fly startup algorithm 620 to initialize the phase voltage controller and power stage which are used to run the motor control algorithm, such as a six-step commutation or the field-oriented control back-EMF observer. Beginning with the rotor position computed step 605, the on-the-fly startup algorithm 620 may use the calculated rotor position to initialize the state of the motor control algorithm at step 606, such as by feeding the sensorless observers with EMF voltages, currents, rotor position, and rotor speed, and setting the PI controllers to the current known state. In some applications which use a back EMF observer or similar arrangement, the observer can be fed with zero currents and with measured motor phase voltages at step 606 to pre-load the observer with inputs before the observer output is used in the control. Additionally, if the motor control structure includes accumulators of state variables (e.g., integrators, memory blocks, delays, filters, etc.), these accumulators should be set at step 606 to the state represented by the time span before the change from the on-the-fly start-up. For example, if the system uses a speed PI controller (a.k.a., PS controller), the "I" controller internal memory (or "S" respectively) should be set to the actual current demand, and the demanded speed should be set to the current speed to prevent the speed error from high initial values. If required, the control algorithm, observers or estimators used to monitor and control the motor may be run in parallel with the windmilling algorithm 510 to align with the rotor position on-the-fly before the power converter is activated, or a smooth transition may be required from the non-active state of the power converter to the fully active drive.

Once the motor control algorithm is initiated, the PM motor is started to run under control of the motor control algorithm at step 607. At this point, the power stage is activated, and the phase voltage controller switches to, for example, a sensorless Field Oriented Control algorithm for operating the 3-phase PM motor. At step 607, motor control enters a run mode and remains in run mode indefinitely or until a reset is detected, at which time then control returns to step 601 to re-start the windmilling algorithm steps 610 as part of the power-up sequencing.

By now it should be appreciated that there is provided herein a method and apparatus for controlling a sensorless multi-phase permanent magnet (PM) motor which has a rotor and a stator. In the disclosed methodology and apparatus, a plurality of induced motor terminal voltages are sensed or observed from the sensorless multi-phase PM motor while the rotor is spinning to generate an input voltage vector signal from the plurality of induced motor terminal voltages. In selected embodiments, the induced motor terminal voltages are sensed by using a resistive voltage divider and a single-ended analog-to-digital converter to observe the plurality of induced motor terminal voltages. In addition, the input voltage vector signal are projected to generate a transformed voltage vector signal which does not include DC-offset components from the input voltage vector signal by using a "beta projection" (Clarke transformation without a zero component) that is applied to the input voltage vector signal. In selected embodiments, the input voltage vector signal is projected to generate the transformed voltage vector signal by transforming a 3-phase input voltage vector signal to a 2-phase transformed voltage vector signal comprising an alpha value and a beta value. In selected embodiments, the transformation of the 3-phase input voltage vector signal to the two-phase transformed voltage vector signal is performed by computing the 2-phase transformed voltage vector signal $$\begin{bmatrix} \alpha_{out} \\ \beta_{out} \end{bmatrix}$$

from the 3-phase input voltage vector signal $$\begin{bmatrix} a_{in} \\ b_{in} \\ c_{in} \end{bmatrix}$$

with the equation:

$$\begin{bmatrix} \alpha_{out} \\ \beta_{out} \end{bmatrix} = \begin{bmatrix} \frac{2}{3} & -\frac{1}{3} & -\frac{1}{3} \\ 0 & \frac{\sqrt{3}}{3} & -\frac{\sqrt{3}}{3} \end{bmatrix} \cdot \begin{bmatrix} a_{in} \\ b_{in} \\ c_{in} \end{bmatrix}.$$

Using the transformed voltage vector signal, an initial rotor position of the rotor is estimated, and at least one or more position detection modules are initialized based on the estimated initial rotor position. In selected embodiments, the initial rotor position is estimated by performing an atan function on a quotient calculated by dividing the alpha value by the beta value. In other embodiments, the initial rotor position is estimated by using a phase lock loop circuit to generate an estimate of a rotor position angle of the transformed voltage vector signal. As disclosed herein, the sensing, projecting, estimating, and initializing steps are all performed while a power converter for the sensorless multi-phase PM motor is disabled. In selected embodiments, the power converter is a multi-phase H-bridge power converter connected to the multi-phase PM motor for monitoring electromotive force induced voltages on the motor terminals of the sensorless multi-phase PM motor. In addition, the disclosed methodology and apparatus may also estimate an initial speed of the rotor based on the transformed voltage vector signal. In selected embodiments, the initial speed of the rotor is estimated by using a phase lock loop circuit connected to a PI controller to generate an estimated rotation frequency of the rotor from the transformed voltage vector signal.

In another form, there is provided an electric motor controller and associated method of operation for controlling a sensorless multi-phase permanent magnet (PM) motor. In the disclosed electric motor controller, a voltage measurement circuit senses or measures a plurality of induced motor terminal voltages from a sensorless multi-phase PM motor while the rotor is spinning to generate an input voltage vector signal from the plurality of induced motor terminal voltages. In selected embodiments, the voltage measurement circuit includes a resistive voltage divider and a single-ended analog-to-digital converter to sense the plurality of induced motor terminal voltages. As disclosed, the voltage measurement circuit is configured to sense the plurality of induced motor terminal voltages while a power converter for the sensorless multi-phase PM motor is disabled. In selected embodiments, the power converter is a multi-phase H-bridge power converter connected to the multi-phase PM motor for monitoring electromotive force induced voltages on the motor terminals of the sensorless multi-phase PM motor. In addition, the electric motor controller includes a processor that is coupled to the voltage measurement circuit and that calculates a transformed input voltage vector signal which does not include DC-offset components by applying a "beta projection" (Clarke transformation without a zero component) to the input voltage vector signal. In the electric motor controller, the processor also calculates an initial rotor position of the rotor from the transformed input voltage vector signal. In selected embodiments, the processor is configured to estimate the initial rotor position by using a phase lock loop circuit to generate an estimate of a rotor position angle of the transformed voltage vector signal. In addition, the electric motor controller's processor may be configured to estimate an initial speed of the rotor based on the transformed voltage vector signal. In selected embodiments, the processor may be configured to estimate the initial speed of the rotor by using a phase lock loop circuit connected to a PI controller to generate an estimated rotation frequency of the rotor from the transformed input voltage vector signal. In selected embodiments, the processor is configured to project the input voltage vector signal to generate the transformed input voltage vector signal by transforming a 3-phase input voltage vector signal to a 2-phase transformed voltage vector signal which includes an alpha value and a beta value. In such embodiments, the processor may be configured to estimate the initial rotor position by performing an atan function on a quotient calculated by dividing the alpha value by the beta value. In other embodiments, the processor is configured to transform the 3-phase input voltage vector signal to the two-phase transformed voltage vector signal by computing the 2-phase transformed voltage vector signal $$\begin{bmatrix} \alpha_{out} \\ \beta_{out} \end{bmatrix}$$

from the 3-phase input voltage vector signal $$\begin{bmatrix} a_{in} \\ b_{in} \\ c_{in} \end{bmatrix}$$

with the equation:

$$\begin{bmatrix} \alpha_{out} \\ \beta_{out} \end{bmatrix} = \begin{bmatrix} \frac{2}{3} & -\frac{1}{3} & -\frac{1}{3} \\ 0 & \frac{\sqrt{3}}{3} & -\frac{\sqrt{3}}{3} \end{bmatrix} \cdot \begin{bmatrix} a_{in} \\ b_{in} \\ c_{in} \end{bmatrix}.$$

In addition, the processor may be configured to initialize at least one or more position detection modules based on said estimated initial rotor position.

In yet another form, there is provided a method and system for on-the-fly startup of a sensorless multi-phase permanent magnet (PM) motor. In the disclosed method and system, a phase voltage measurement block is provided for sensing a plurality of induced motor terminal voltages from the sensorless multi-phase PM motor while the rotor is spinning to generate an input voltage vector signal. In addition, a windmilling block is provided for estimating an initial rotor position of the rotor. The windmilling block includes a transform block for generating a transformed input voltage vector signal which does not include DC-offset components by applying a "beta projection" (Clarke transformation without a zero component) to the input voltage vector signal. The windmilling block also includes an estimator block for computing an estimated initial rotor position of the rotor from the transformed voltage vector signal. In operation, the phase voltage measurement block and windmilling block are configured to operate when the rotor is rotating while a power converter for the sensorless multi-phase PM motor is disabled. In selected embodiments, the transform block may be configured to project the input voltage vector signal to generate the transformed input voltage vector signal by transforming a 3-phase input voltage vector signal to a 2-phase transformed voltage vector signal comprising an alpha value and a beta value. In addition, the estimator block may be configured to estimate the initial rotor position by performing an atan function on a quotient calculated by dividing the alpha value by the beta value.

Various illustrative embodiments of the present invention have been described in detail with reference to the accompanying figures. While various details are set forth in the foregoing description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified block diagrams and flow charts illustrating design and operational details of a sensorless PM motor control method and apparatus without including every device feature or aspect in order to avoid limiting or obscuring the present invention. Such descriptions and representations are used by those skilled in the art to describe and convey the substance of their work to others skilled in the art, and the omitted details which are well known are not considered necessary to teach one skilled in the art of how to make or use the present invention.

Although the described exemplary embodiments disclosed herein are directed to a sensorless motor control method and apparatus in which the position and speed of a spinning rotor may be detected by using a "beta projection" (Clarke transform without a zero component) to project an EMF motor terminal voltage vector into a transformed voltage vector to remove any voltage offsets and distortions which may be introduced by typical hardware implementation, the present invention is not necessarily limited to the example embodiments which illustrate inventive aspects of the present invention that are applicable to a wide variety of applications. Thus, the particular embodiments disclosed above are illustrative only and should not be taken as limitations upon the present invention, as the invention may be modified and practiced in different but equivalent manners apparent to those skilled in the art having the benefit of the teachings herein. For example, the methodology and apparatus disclosed herein may be applied to efficiently implement a sensorless motor control algorithm with low cost and complexity that is suitable for variable motor applications requiring the precise identification of a position of the rotor in time to start driving the motor properly. In addition, the process steps may be performed in an alternative order than what is presented. Furthermore, those skilled in the art will recognize that boundaries between the functionality of the above described operations merely illustrative. The functionality of multiple operations may be combined into a single operation, or the functionality of a single operation may be distributed in additional operations. Moreover, alternative embodiments may include multiple instances of a particular operation, and the order of operations may be altered in various other embodiments. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

As disclosed herein, the sensorless PM motor control computer product, computing device, system, method, and apparatus may include or use computer program code executable on one or more central processing units or other processing devices to observe and transform the EMF voltages into a projected vector space where signal distortions, such as DC-offset components, in the motor terminal input voltage signal are eliminated or suppressed, thereby enabling a direct calculation of the rotor position from the transformed EMF voltages. As such, the sensorless PM motor control may be implemented by way of executable program code stored within a non-transitory computer program. As used herein, the expression non-transitory will be understood to refer to the non-ephemeral nature of the storage medium itself rather than to a notion of how long the stored information itself may persist in a stored state. Accordingly, memories that might otherwise be viewed, for example, as being volatile (such as many electronically-erasable programmable read-only memories (EPROM's) or random-access memories (RAM's)) are nevertheless to be viewed here as being "non-transitory" whereas a signal carrier in transit is to be considered "transitory" notwithstanding that the signal may remain in transit for a lengthy period of time.). In other embodiments, the sensorless motor control may be implemented by microcontroller, microprocessor, advanced RISC machine (ARM) processor, field-programmable gate array (FPGA) and/or ad-hoc hardware (e.g., dedicated silicon solutions) in which the sensorless motor control algorithms are advantageously embodied for more efficient processing and improved computational performance.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. In addition, the term "coupled," as used herein, is not intended to be limited to a direct coupling or a mechanical coupling. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for controlling a sensorless multi-phase permanent magnet (PM) motor comprising a rotor and a stator, the method comprising:

sensing a plurality of induced motor terminal voltages from the sensorless multi-phase PM motor while the rotor is spinning to generate an input voltage vector signal from the plurality of induced motor terminal voltages;

projecting the input voltage vector signal to generate a transformed voltage vector signal by applying a transformation to the input voltage vector signal to remove DC-offset components from the input voltage vector signal;

estimating an initial rotor position of the rotor from the transformed voltage vector signal; and initializing at least one or more position detection modules based on said estimated initial rotor position;

wherein one or more power converter switches are configured to couple and uncouple a power converter to the sensorless multi-phase PM motor, and wherein said sensing, projecting, estimating, and initializing are performed while the one or more power converter switches uncouple the power converter from the sensorless multi-phase PM motor.

2. The method of claim 1, where projecting the input voltage vector signal to generate the transformed voltage vector signal comprises transforming a 3-phase input voltage vector signal to a 2-phase transformed voltage vector signal comprising an alpha value and a beta value.

3. The method of claim 2, where estimating the initial rotor position comprises performing an atan function on a quotient calculated by dividing the alpha value by the beta value.

4. The method of claim 2, where transforming the 3-phase input voltage vector signal to the two-phase transformed voltage vector signal comprises computing the 2-phase transformed voltage vector signal $$\begin{bmatrix} \alpha_{out} \\ \beta_{out} \end{bmatrix}$$

from the 3-phase input voltage vector signal $$\begin{bmatrix} a_{in} \\ b_{in} \\ c_{in} \end{bmatrix}$$

with the equation:

$$\begin{bmatrix} \alpha_{out} \\ \beta_{out} \end{bmatrix} = \begin{bmatrix} \frac{2}{3} & -\frac{1}{3} & -\frac{1}{3} \\ 0 & \frac{\sqrt{3}}{3} & -\frac{\sqrt{3}}{3} \end{bmatrix} \cdot \begin{bmatrix} a_{in} \\ b_{in} \\ c_{in} \end{bmatrix}.$$

5. The method of claim 1, where sensing the plurality of induced motor terminal voltages comprises using a resistive voltage divider and a single-ended analog-to-digital converter to observe the plurality of induced motor terminal voltages.

6. The method of claim 1, where the power converter comprises a multi-phase H-bridge power converter coupled to the multi-phase PM motor by the one or more power converter switches, wherein the multi-phase H-bridge power converter is for monitoring electromotive force induced voltages on the motor terminals of the sensorless multi-phase PM motor.

7. The method of claim 1, further comprising estimating an initial speed of the rotor based on the transformed voltage vector signal.

8. The method of claim 7, where estimating the initial speed of the rotor comprises using a phase lock loop circuit connected to a PI controller to generate an estimated rotation frequency of the rotor from the transformed voltage vector signal.

9. The method of claim 1, where estimating the initial rotor position comprises using a phase lock loop circuit to generate an estimate of a rotor position angle of the transformed voltage vector signal.

10. An electric motor controller comprising:
a voltage measurement circuit for sensing a plurality of induced motor terminal voltages from a sensorless multi-phase PM motor while a rotor is spinning to generate an input voltage vector signal from the plurality of induced motor terminal voltages; and
a processor coupled to the voltage measurement circuit to calculate:
a transformed input voltage vector signal with DC-offset components removed by applying a transformation to the input voltage vector signal, and
an initial rotor position of the rotor from the transformed input voltage vector signal;
wherein one or more power converter switches are configured to couple and uncouple a power converter to the sensorless multi-phase PM motor, and wherein the voltage measurement circuit is configured to sense the plurality of induced motor terminal voltages while the one or more power converter switches uncouple the power converter from the sensorless multi-phase PM motor.

11. The electric motor controller of claim 10, wherein the processor is configured to initialize at least one or more position detection modules based on said estimated initial rotor position.

12. The electric motor controller of claim 10, wherein the processor is configured to project the input voltage vector signal to generate the transformed input voltage vector signal by transforming a 3-phase input voltage vector signal to a 2-phase transformed voltage vector signal comprising an alpha value and a beta value.

13. The electric motor controller of claim 12, wherein the processor is configured to estimate the initial rotor position by performing an atan function on a quotient calculated by dividing the alpha value by the beta value.

14. The electric motor controller of claim 12, wherein the processor is configured to transform the 3-phase input voltage vector signal to the two-phase transformed voltage vector signal by computing the 2-phase transformed voltage vector signal $$\begin{bmatrix} \alpha_{out} \\ \beta_{out} \end{bmatrix}$$

from the 3-phase input voltage vector signal $$\begin{bmatrix} a_{in} \\ b_{in} \\ c_{in} \end{bmatrix}$$

with the equation:

$$\begin{bmatrix} \alpha_{out} \\ \beta_{out} \end{bmatrix} = \begin{bmatrix} \frac{2}{3} & -\frac{1}{3} & -\frac{1}{3} \\ 0 & \frac{\sqrt{3}}{3} & -\frac{\sqrt{3}}{3} \end{bmatrix} \cdot \begin{bmatrix} a_{in} \\ b_{in} \\ c_{in} \end{bmatrix}.$$

15. The electric motor controller of claim 10, wherein the voltage measurement circuit comprises a resistive voltage divider and a single-ended analog-to-digital converter to sense the plurality of induced motor terminal voltages.

16. The electric motor controller of claim 10, where the power converter comprises a multi-phase H-bridge power converter coupled to the multi-phase PM motor by the one or more power converter switches, wherein the multi-phase H-bridge power converter is for monitoring electromotive force induced voltages on the motor terminals of the sensorless multi-phase PM motor.

17. The electric motor controller of claim 10, where the processor is configured to estimate an initial speed of the rotor based on the transformed voltage vector signal.

18. The electric motor controller of claim 17, where the processor is configured to estimate the initial speed of the rotor by using a phase lock loop circuit connected to a PI controller to generate an estimated rotation frequency of the rotor from the transformed input voltage vector signal.

19. The electric motor of claim 10, where the processor is configured to estimate the initial rotor position by using a phase lock loop circuit to generate an estimate of a rotor position angle of the transformed voltage vector signal.

20. A system for on-the-fly startup of a sensorless multi-phase permanent magnet (PM) motor, comprising:
a phase voltage measurement block for sensing a plurality of induced motor terminal voltages from the sensorless multi-phase PM motor while a rotor is spinning to generate an input voltage vector signal; and
a windmilling block for estimating an initial rotor position of the rotor, comprising:
a transform block for generating a transformed input voltage vector signal DC-offset components removed by applying a beta projection transformation to the input voltage vector signal, and
an estimator block for computing an estimated initial rotor position of the rotor from the transformed voltage vector signal;

wherein one or more power converter switches are configured to couple and uncouple a power converter to the sensorless multi-phase PM motor, and wherein the phase voltage measurement block and windmilling block are configured to operate when the rotor is rotating while the one or more power converter switches uncouple the power converter from the sensorless multi-phase PM motor.

21. The system of claim 20, where the transform block is configured to project the input voltage vector signal to generate the transformed input voltage vector signal by transforming a 3-phase input voltage vector signal to a 2-phase transformed voltage vector signal comprising an alpha value and a beta value.

22. The system of claim 21, wherein the estimator block is configured to estimate the initial rotor position by performing an atan function on a quotient calculated by dividing the alpha value by the beta value.

23. The system of claim 21, wherein the transform block is configured to generate the transformed input voltage vector signal by applying a transformation selected from the group consisting of a Clarke transformation without a zero component, a Clarke transformation with the zero component neglected, and a beta-projection Clarke transformation.

* * * * *